March 27, 1928.
W. S. MAYERS
1,663,915
UNIVERSAL SAND DAMPER FOR HOT GAS CONDUITS
Filed March 27, 1922
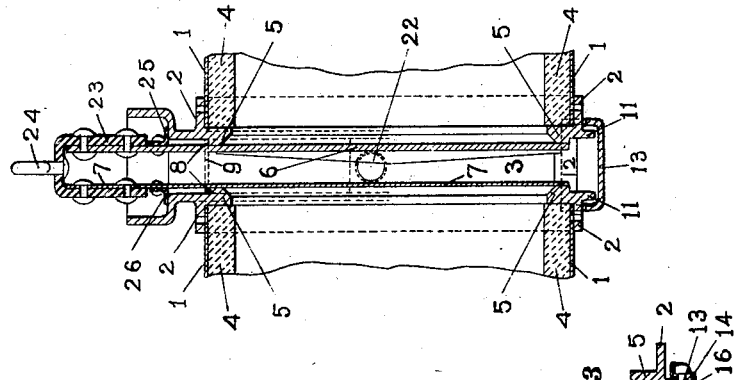
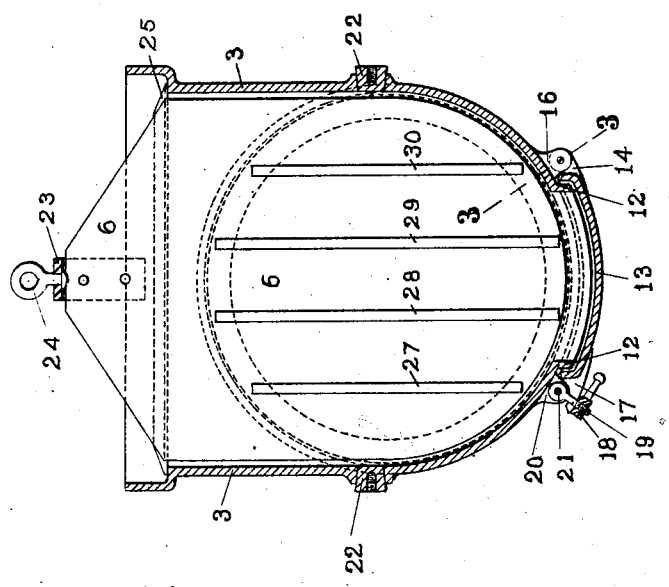
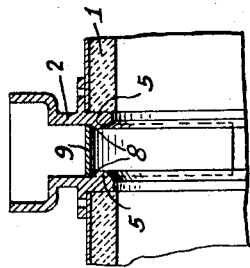
INVENTOR.
Wilbur S. Mayers Patented Mar. 27, 1928.

1,663,915

UNITED STATES PATENT OFFICE.

WILBUR S. MAYERS, OF FAIRMONT, WEST VIRGINIA.

UNIVERSAL SAND DAMPER FOR HOT-GAS CONDUITS.

Application filed March 27, 1922. Serial No. 547,317.

This invention relates to dampers or valves for shutting off and reestablishing the current of hot gas in the mains and branches of conduits leading from gas producers to the various combustion chambers, or for hot gases from combustion chambers, and is designed to be used in horizontal ducts or flues.

Up to the present time no satisfactory damper for use in horizontal hot gas ducts has been brought out, although dampers for vertical ducts of this nature are in common use,—all depending upon the use of sand, loose clay, and the like for sealing. Any such device depending upon plates or slides working in close fitting grooves or seats without the use of an easily renewable refractory sealing material is impracticable on account of the warping of the slides due to the heat, and to the cementing effect of the baked tar, which is always incidental to the use of bituminous coals.

In many installations of hot producer gas conduits it is impracticable, or inconvenient and expensive, to provide vertical branches wherein horizontal dampers may be used. In nearly all such installations the predominating run of conduits is in the horizontal position. My device is also adapted for use in vertical conduits, or those set in any position, in the manner hereinafter described, thus making it of universal application.

In the accompanying drawing Figure 1 is a vertical transverse section through the center-line of the damper. Figure 2 is a vertical section, longitudinally with the conduit, through the center-line and Figure 3 is a section through the line 3—3 of Figure 1. Figure 4 is a fragmentary view of the upper portion of Figure 2, showing the damper plates removed and the seal-plate in position.

It is understood in this specification that the names of the various parts, when given in the plural and followed by a single reference numeral, will indicate that such parts are in pairs, one on either side of the damper, and that they are horizontally opposite to one another and in reversed positions.

Figure 2 shows short broken sections of the leading-in and -out conduits 1, and these are securely bolted or riveted to the rims 2 which are integral parts of the damper case 3. The refractory linings 4 are usually provided for the protection of the metal conduit walls, as well as for heat insulation, and abut the inwardly projecting flanges 5, which are integral parts of the damper case. These flanges are beveled or chamfered on their inner faces to facilitate the entrance of the damper plates when they are approaching their closed position in the case. Their inner edges are subject to roughening and incrustation from the action of the hot gases, and the beveled edges allow this to take place without forcing the plates away from their seats on the sides of the flanges.

At the upper side of the case 3 the walls bend outward and then upward at right angles, thus enlarging at its top the rectangular opening which is provided for the insertion of the damper plates and the sealing material. This enlargement at the top is preferably made about nine inches, measured transversely with the case, so that bricks of standard dimensions, with mud joints, may be used to close the opening when the duplex damper plates 6, 7 are withdrawn to permit the flow of gas.

The flanges 5 project short distances inwardly beyond the transverse walls of the case, forming the ledges 8 which provide bearings for the curved seal-plate 9. This plate is bent to fit the curvature of the ledges 8 and, when inserted, completely closes the throat of the case in a semi-circumferential position, at or about in line with the metal walls of the conduit. When it is desired to pass the gases through the damper this plate may be inserted and the space above it filled with loose sealing material, or it may be left out and the external outlet sealed with bricks and the joints mudded as above described.

At the bottom of the case is a rectangular opening bounded by the downwardly extending flanges 11, 12 which form a sealing curb around the opening. This curb is covered by the cup shape door 13, which swings within planes radial to the axis of the conduit. The upwardly extending rims of the door loosely encompass the walls of the curb, the upper edges of these rims and the lower edges of the curb being concentric to the curved part of the case. When the door is closed, as shown in Figures 1, 2 and 3, it is obviously self-sealing against the escape of the loose sealing material above it. The hinges 14 are pintled on the bolt 15 which passes through the hinges and the lugs 16 projecting from the curved wall of the case. On the swinging end of the door the fingers 17 are in position to be engaged by the clamp-nut 18 which is threaded to the swinging bolt. Through the lugs 20 passes the pintle 21, so that when it is desired to open the door the clamp-nut is loosened and the bolt 19 swung out of engagement with the fingers 17.

The damper plates 6, 7 entirely cover the circular openings formed by the flanges 5 with sufficient lap to include the bevels and part of the radial faces of the flanges, but with a safe margin of clearance between the edges of the dampers and the curved wall of the case.

Above the horizontal center-line of the conduit and the part of the case concentric thereto the damper plates are parallel to and in safe clearance with the straight transverse walls of the case. From the bottom of the enlargement at the top of the case the plates extend upward a convenient distance and may be tapered as shown in Figure 1 to avoid excess of metal and weight. The plates are rigidly attached at their tops to the U shaped connector 23, preferably by bolts, so that the two plates are handled as a unit part, and the eye-bolt 24 provides a convenient attachment for lifting them from and lowering them into the case. The angle bars 25, 26 are riveted to the plates 6, 7 respectively, extending horizontally across their full width and projecting short distances on both sides of the plates. These angle bars rest upon the offset formed by the enlargement in the top of the case and support the weight of the plates. They also serve to prevent the sealing material from sifting through any interstices which might exist between the plates and the walls of the case.

The plate on the side of the incoming gas is preferably made of cast iron one half inch or more in thickness and stiffened against warpage due to the heat by the ribs 27, 28, 29, 30. The plate on the outgoing side is not subjected to any great degree of heat, owing to the insulating qualities of the sealing material, and it may be made of sheet metal of sufficient thickness to withstand the mechanical stresses produced by the sealing material. The curved plate 9 is subject to a more or less high temperature and may be made either of a suitable metal or a refractory material.

When it is desired to close the damper the plates are lowered into the case and the door 13 closed as shown in Figures 1 and 2. Loose sealing material is then packed in the space between the plates and all around them level with the top of the case, the gas being thus sealed against passing through the damper or to the outside. When it is desired to open the damper the door 13 is first opened when the sealing material will either pass through the opening by gravity, or it may be dug out by pointed steel bars through this opening or from the top of the case. By removing the plugs 22 additional apertures are provided for any digging which may be necessary.

After the sealing material has been thus removed the plates may be lifted unless the plate 6 may have adhered to the flange 5 on account of tar deposits. In this case, due to the method of attachment, it may be sprung away from the flange by suitable means, after which it may be easily withdrawn. The thin plate 7 has a considerable amount of flexibility which allows either plate to be sprung away from its seat. After the removal of the plates the door 13 is closed and the top of the case is sealed in the manner above described.

In this specification the terms "bottom", "top", etc., refer to the damper as set in the vertical position, but when constructed in the manner described it is obvious that it may be utilized in conduits running either horizontally or vertically, or in any intermediate angles or positions. When used in vertical conduits the thin plate 7 may be removed and, with the heavy plate 6 at the lower side of the case, the sealing material may be placed through the exterior openings in the case, or through a door in the conduit in a manner similar to that prevailing in the use of horizontal dampers as at present constructed.

It is often desirable to construct the plate 6 with a facing of suitable refractory material on the side exposed to the hot gas, although in practical operation this is not a strict requirement. The space between the plates allows a considerable amount of warpage to take place without bringing the plates into contact with one another, and this space may be increased or diminished as may be required.

Having thus described my invention I claim:

1. A sand damper, comprising a case having an orifice in each side thereof and provided with means of attachment to incoming and outgoing conduits, there being a chamber between the orifices of greater transverse dimensions than the corresponding dimensions of the flow area of said conduits and having an exterior opening adapted to receive damper plates and sealing material, and a removable duplex damper covering both orifices when inserted into said chamber, said damper comprising two plates interconnected outside of the area of flow of said conduit and yieldable toward and away from each other within said flow area.

2. A sand damper comprising a case having opposed seats, and a removable duplex damper slide comprising two plates rigidly interconnected by means permitting said plates to yield toward one another and away from said seats, said plates being connected outside of the area defined by said seats.

3. A sand damper case having opposed inwardly extending flanges below the upper end of the case, such flanges forming seats for damper slides, and defining an orifice, and also defining shoulders arranged above said orifice and below the upper end of the damper case for receiving and supporting a sealing plate.

4. A sand damper case having opposed inwardly extending flanges below the upper end of the case, such flanges forming seats for damper slides, and defining an orifice, and also defining shoulders arranged above said orifice and below the upper end of the damper case for receiving and supporting a sealing plate, the inner faces of such flanges being bevelled for the purposes described.

5. In a sand damper, the combination of a case comprising a chamber, a duplex damper slide having its plates received and seated therein, such chamber at its upper end being enlarged, the walls of the enlarged upper end surrounding the plates, and being entirely spaced therefrom, and loose refractory sealing material arranged in the enlarged upper end of the case and entirely surrounding the individual plates of the slide.

6. In a sand damper, the combination with a case having opposed seats, of a slide movable into and out of the case and comprising spaced plates connected together and adapted to have loose refractory material packed therebetween, each of said plates bearing against one of the seats, said plates being yieldable away from said seats when the refractory material is removed.

7. In a sand damper, the combination with a case having opposed seats, of a slide comprising spaced plates interconnected and yieldable with respect to each other, with each plate bearing against one of the seats, and means other than said seats for effecting sealing of the damper.

8. A duplex slide adapted for insertion and double seating in a vertical sand damper case, said slide comprising two plates substantially similar in size and outline, one plate being adapted to resist the deteriorating action of hot gases and both serving as retainers of loose sealing material, the pair being yieldably connected, one to the other, in the manner described.

9. A duplex slide adapted for insertion in a vertical sand damper case, said slide comprising two plates yieldable with respect to each other and having horizontally disposed projections on the outer faces of said plates for supporting their weight and for sealing the interstices between them and the adjacent walls of the case.

10. A vertical sand damper comprising a case with an opening exterior to the connecting conduit, and a removable duplex slide comprising spaced plates rigidly connected together, one of said plates being flexible, adapted for double seating within the case and for forming and enclosing a diaphragm of loose refractory sealing material across the path of the gas in the conduit.

11. A vertical sand damper comprising a case with an exterior opening, a removable duplex damper slide comprising spaced plates rigidly interconnected, one of said plates being sufficiently flexible to allow said plates to yield toward one another, said slide forming, when inserted in the case, a container for a diaphragm of loose sealing material across the path of the gas in the conduit, said exterior opening being adapted for the insertion of sealing material after the slide has been removed, thus allowing free passage of the gas through the case.

12. In a sand damper, the combination with a case having opposed seats, of a slide comprising spaced plates yieldable with respect to each other and bearing against the seats, and loose refractory material packed between the plates, said plates being held against said seats solely by the refractory material and being adapted to flex away from the seats when the refractory material is removed.

WILBUR S. MAYERS.